F. PHILLIPS.
TRAP.
APPLICATION FILED AUG. 28, 1919.
1,368,749.
Patented Feb. 15, 1921.
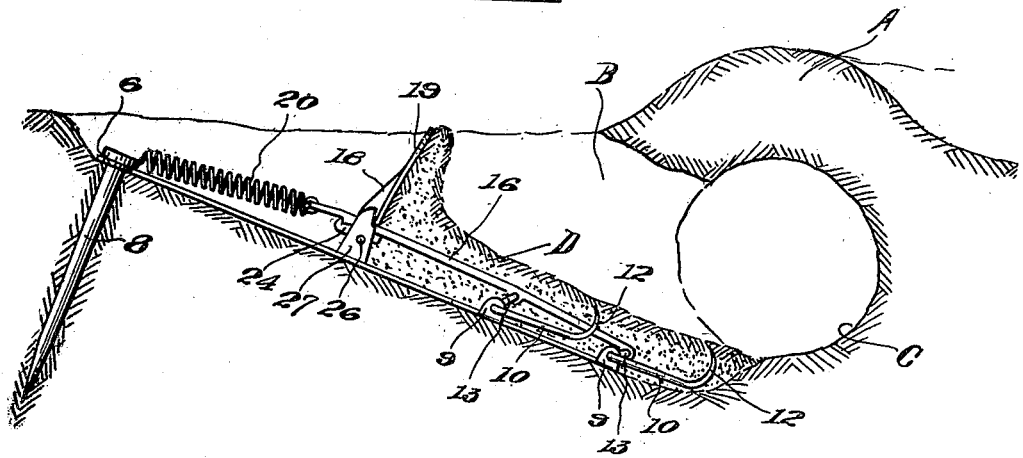
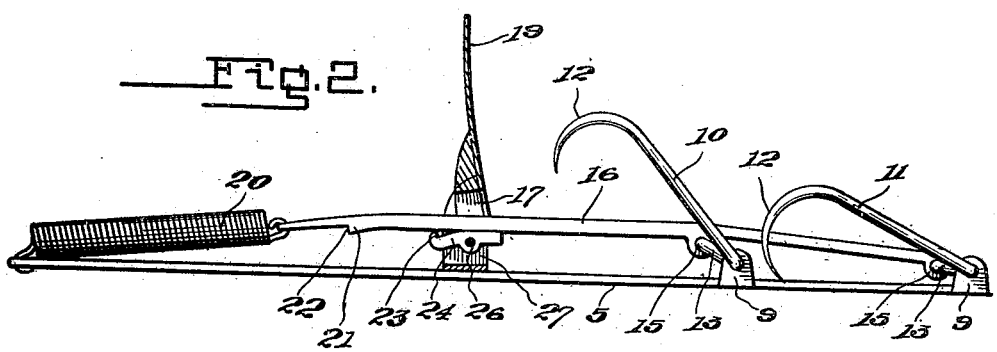
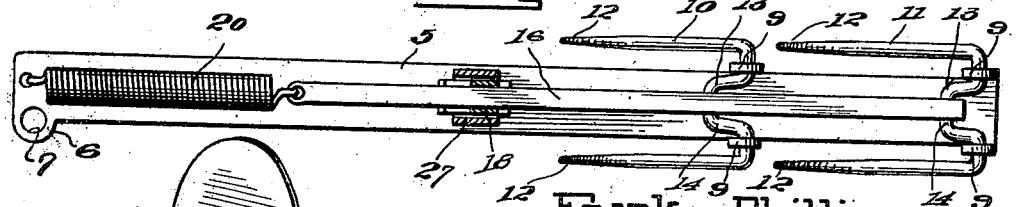
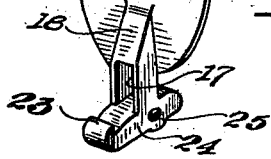
Frank Phillips
Inventor

UNITED STATES PATENT OFFICE.

FRANK PHILLIPS, OF FORT CROOK, NEBRASKA.

TRAP.

1,368,749.

Specification of Letters Patent.  Patented Feb. 15, 1921.

Application filed August 28, 1919. Serial No. 320,384.

*To all whom it may concern:*

Be it known that I, FRANK PHILLIPS, a citizen of the United States, residing at Fort Crook, in the county of Sarpy and State of Nebraska, have invented certain new and useful Improvements in Traps, of which the following is a specification.

This invention relates to traps particularly designed for destroying gophers, or analogous rodent, and an object of the invention is to provide a trap which the gopher or other rodent will operate, himself, when working.

The known characteristic of the gopher is that while working the gopher brings the dirt out of his main tunnel to the surface by making a hole from his main tunnel and his presence may be noted by a mount which accumulates in this manner, and it is also a known fact that greater success is obtained by efforts to trap or catch the gopher at these mounds. However, the majority of traps designed for this purpose are such that the gopher either operates them by the dirt which he pushes in front of himself, or he gets them covered and clogged with loose dirt or soil, which interferes with their operation, leaving the gopher free to work his will; and it is an object of this invention to provide a trap which is so constructed that it will not become crowned by the loose dirt which the gopher pushes in front of himself when carrying the dirt from the main tunnel to the mound as is his practice, and also one which may be set or operated by the pressure of the dirt thereagainst, the doors or grappling elements being arranged, from the tripping mechanism such distance as they will engage the gopher, even though he operate the trap by the pressure of the dirt which he is pushing in front of himself.

It is also a known fact that if the territory of the gopher is tampered with, such as by making an opening in his mound he will fill up the said opening immediately after he discovers the same, and in using the improved trap, this fact is made use of to facilitate the catching of the gopher by the trap, the trap including an upstanding trip pan which has a pawl associated therewith adapted to hold a suitable spring under tension, with which springs are associated a plurality of grapples or jaws, having arcuate free ends sharpened to form piercing points, which when the trip pan is operated by pressure thereagainst, will be drawn upwardly and over for catching and consequently killing the gopher inwardly of the trip pan.

Other objects of the invention will appear in the following detailed description taken in connection with the accompanying drawings, forming a part of this specification, and in which drawings:

Figure 1 is a side elevation of the improved trap showing the same set in proper relation with the gopher mound.

Fig. 2 is a side elevation of the improved trap illustrating it in an operated position, and showing the improved trip pan in section.

Fig. 3 is a top plan of the trap having the trip pan in section, and

Fig. 4 is a detail perspective view of the trip pan.

Referring more particularly to the drawings, the improved trap comprises a brace or supporting bar 5 preferably formed of a flat piece of metal, and having a laterally offset ear 6 at one end thereof, which is provided with an opening 7, adapted to receive an anchoring pin 8, therethrough, to securely anchor the trap in place. A plurality of ears 9 are struck up from the body 5 along its edges at the end opposite the end upon which the lateral 6 is formed, and these ears rockably support the grappling jaws 10 and 11. Each of the jaws 10 and 11 is preferably formed of a single length of rod metal bent to form substantially a U shape, and having the free end 12 of its legs, curved downwardly, and sharpened as clearly shown in Figs. 1 and 2 of the drawings, for forming piercing points to freely enter the body of the gopher or other rodent. The bight portions 13 of the jaws 10 and 11 are provided with crank portions 14, the wrists of which are connected to depending ears 15, formed upon an operating rod 16. This operating rod 16 extends through an opening 17, formed in the shank 18 of the trip pan 19 and it has its outer end connected to a contractile spiral spring 20, the normal tendency of which is to draw the bar 16 outwardly, and consequently bring the jaws 10 and 11 over, positioning their sharpened pointing ends downwardly as illustrated in Fig. 2 of the drawings, the said downward movement of the jaws being provided through the crank connection with the rod 16, and the manner of rockably supporting the jaws by the ears 9. The rod 16 has a depending lug 21 formed thereon forming a shoulder 22, facing the spring 20 which shoulder is adapted to be engaged by the bill and nib 23 of the pawl 24, which is formed upon the shank 18 of the trip pan 19. This pawl 24 receives through the opening 25 therein a pin 26, which pin extends through brackets 27 carried by the supporting base 5 for pivotally supporting the trip pan 19.

The trip pan 19 rests in substantially a vertical plane with respect to the horizontal plane of the body 5, and when the trap is set it leans slightly toward the jaws 10 and 11, it being adapted to be forced outwardly upon its pivot 26, rocking the pawl 24 to move the bill or nib 23 thereof out of engagement with the shoulder 22 to permit the spring 20 to draw the arms or rods 16 outwardly for operating the jaws 10 and 11.

In setting the trap, a gopher mound as indicated at A in Fig. 1 of the drawings is first discovered and then by means of a scraper or any suitable instrument, this mound is opened, by a passageway as indicated at B. The trap structure is then placed with the supporting base 5, resting upon the bottom of the passageway B, which passageway is preferably dug slightly deeper than the deepest portion of the tunnel C of the gopher, so that the trap may be placed upon the mound of the passageway and leave dirt thrown over the upper surface of the trap entirely covering jaws 10 and 11 and rod 16, as clearly shown in Fig. 1 of the drawings, the said dirt having a separate surface substantially flush with the lowermost portion of the tunnel C and gradually inclining upwardly therefrom in accordance with the inclining of the passageway or opening B. The loose dirt, as indicated at D is also preferably placed against the inner surface of the trip pan 19. When the trap is thus set, the fastened arcuate ends of the jaws 10 and 11 extend upwardly, and when a gopher discovers that his tunnel C has been tampered with, such as by the opening B, he will immediately set to work to close up this opening B, this being his natural tendency as has been determined by observation. In closing the opening or passageway B, the gopher will, as is his usual practice force dirt out of the mound A into the passageway, in front of himself and in so doing he will push the dirt outwardly as far as he can or up against the dirt or soil D against the trip pan 19, and his pressure against this dirt and consequently against the trip pan 19, will be sufficient to rock the trip pan sufficiently to disengage the pawl 24 with the shoulder 22, thereby permitting the spring 20 to act moving the rod 16 outwardly, and bringing the sharpened ends 12 of the jaws 10 and 11 upwardly and over, and down into the gopher, in that these jaws are spaced sufficient distance from the trip pan 19 to engage the gopher even though he is a little distance behind the dirt which engages the trip pan 19. This forward or outward movement of the jaws 10 and 11, will have a tendency to drag the gopher outwardly and if only his head portion is engaged by one of the jaws, he will be dragged or drawn outwardly, by the action of the trap and thoroughly pierced by the sharpened ends 12, both catching and killing him.

The trap may be easily and safely set by engaging in the concaved surface of the curved portions 12 of the legs of the jaw 11, and rocking this member or jaw rearwardly, upon its pivotal support, which will also rock the jaw 10 and move the rod 16, tensioning the spring 20. Then when the rod has been moved a proper distance, the nib or bill 23 will engage the shoulder 22 and hold the rod 16 against return movement under action of the spring 20, permitting the setting of the trap and holding the trap set until the trip plate or pan 19 is moved rearwardly or toward the spring 20 which will release the trap for operation.

From the foregoing description taken in connection with the accompanying drawings, it will be apparent that a trap has been devised which is comparatively simple, in construction, durable, and one which will operate in every instance, upon the application of pressure against the trip pan 19, as well as one which cannot become clogged or inoperative by the loose dirt thereon.

Changes in details may be made without departing from the spirit of this invention, but,

I claim:

1. In a trap, the combination of a longitudinally extending supporting base, a plurality of longitudinally spaced piercing jaws arranged in longitudinal alinement and including a piercing portion and a crank portion, spring actuated means connected to the crank portion for operating said jaws, and trip means for controlling the operation of said spring actuated means.

2. In a trap, the combination of a supporting base, a plurality of sets of piercing jaws rockably carried on said base, and including crank portions, a rod connected to said crank portions, a spring connected to said rod for rocking said piercing jaws to move them into an animal engaging position, and trip means normally restraining operation of said rod by said spring.

3. In a trap, the combination of a supporting base, piercing jaws rockably carried by said base and including a pair of legs having their free ends arcuated and sharpened to form piercing points, a crank portion connecting said legs at their ends opposite said piercing points, spring actuated means connected to said crank portions for operating the jaws, and trip means for normally restraining operation of said spring actuated means.

4. In a trap, the combination, of a supporting base, piercing jaws rockably carried by said base and including a pair of legs each having its inner end connected by a crank portion, the free ends of said legs being arcuated and sharpened to form piercing points, a rod connecting said crank portions, a spring connected to said rod for moving said piercing jaws into an animal engaging position, and trip means normally restraining said rod from movement under action of said spring.

5. In a trap, the combination of a longitudinally extending supporting base, spaced piercing jaws rockably supported on said base and each including a crank portion, a rod connected to said crank portions, a spring connected to said rod for normally urging said jaws into an animal engaging position, a rockably mounted trip pan carried by and extending at right angles to the supporting base, and means formed upon said trip pan for engagement with said rod to normally restrain the rod against movement under action of said spring.

6. In a trap, the combination, of a supporting base, a piercing jaw rockably carried by said base and including an arcuate sharpened point, adapted to pierce an animal, a crank portion connected to said piercing portion, a longitudinally movable rod, a trip pan, a shank upon said trip pan, said rod extending through said shank, a spring connected to said rod for normally urging said piercing point into an animal piercing position, a shoulder formed upon said rod, and a pawl carried by the shank of said trip pan for engagement with said shoulder to normally restrain said rod from movement under action of said spring.

7. In a trap, the combination, of a supporting base, a jaw rockably carried by said base and including an animal engaging portion and a crank portion, a rod connected to said crank portion, a trip pan, a shank formed thereon and provided with an opening, said rod extending through the opening in said trip pan shank, a spring connected to said rod, a shoulder formed upon the rod, a pawl formed upon said trip pan shank and adapted for engagement with said shoulder to normally hold said rod against movement by action of said spring, said pawl adapted to be moved out of engagement with the shoulder to release the rod upon movement of the trip pan.

8. In a trap, the combination, of a supporting base, a plurality of piercing jaws rockably carried by said base and each including a pair of legs, crank portions connecting corresponding ends of said legs, the free ends of said legs being arcuated and sharpened to form piercing points, a rod connected to the crank portions of said piercing jaws, a spring connected to said rod for moving the rod to rock the jaws, for moving said piercing points into piercing operation, a rockably mounted trip pan, means carried by said trip pan for engagement with said rod to normally restrain the rod and jaws against movement under action of said spring.

FRANK PHILLIPS.